US009703569B1

(12) United States Patent
Holcomb et al.

(10) Patent No.: US 9,703,569 B1
(45) Date of Patent: Jul. 11, 2017

(54) HARDWARE INDEPENDENT IMAGING METHOD

(75) Inventors: Stephen B. Holcomb, Quincy, IL (US); Jason M. Drinen, Barnhart, MO (US)

(73) Assignee: ALTRINSIC SOLUTIONS, LLC, Tucson, AZ (US)

( * ) Notice: Subject to any disclaimer, the term of this patent is extended or adjusted under 35 U.S.C. 154(b) by 54 days.

(21) Appl. No.: 13/453,327

(22) Filed: Apr. 23, 2012

Related U.S. Application Data

(62) Division of application No. 11/972,500, filed on Jan. 10, 2008, now Pat. No. 8,181,186.

(60) Provisional application No. 60/879,968, filed on Jan. 11, 2007.

(51) Int. Cl.
*G06F 3/00* (2006.01)
*G06F 15/16* (2006.01)
*G06F 9/44* (2006.01)
*H04L 29/06* (2006.01)
*H04L 12/44* (2006.01)
*G06F 9/54* (2006.01)

(52) U.S. Cl.
CPC .......... *G06F 9/4411* (2013.01); *G06F 9/4416* (2013.01); *G06F 9/54* (2013.01); *H04L 12/44* (2013.01); *H04L 67/42* (2013.01)

(58) Field of Classification Search
CPC .................................... G06F 9/54; G06F 8/34
USPC ........................................ 719/310; 717/106
See application file for complete search history.

(56) References Cited

U.S. PATENT DOCUMENTS

| | | | |
|---|---|---|---|
| 8,370,479 B2* | 2/2013 | Hart | H04L 41/0893 709/224 |
| 8,625,544 B2* | 1/2014 | Kats | H04W 8/30 370/337 |
| 9,439,218 B2* | 9/2016 | Kats | H04W 74/02 |
| 2007/0097883 A1* | 5/2007 | Liu | H04L 41/12 370/254 |

OTHER PUBLICATIONS

Nikhil R. Pal, Generalized Clustering Networks and Kohonen's Self-Organizing Schema, 1993.*

* cited by examiner

*Primary Examiner* — Lechi Truong
(74) *Attorney, Agent, or Firm* — Lewis Roca Rothgerber Christie LLP

(57) ABSTRACT

A new and useful method is provided, for harvesting drivers for deployment in an operating systems environment.

7 Claims, 1 Drawing Sheet

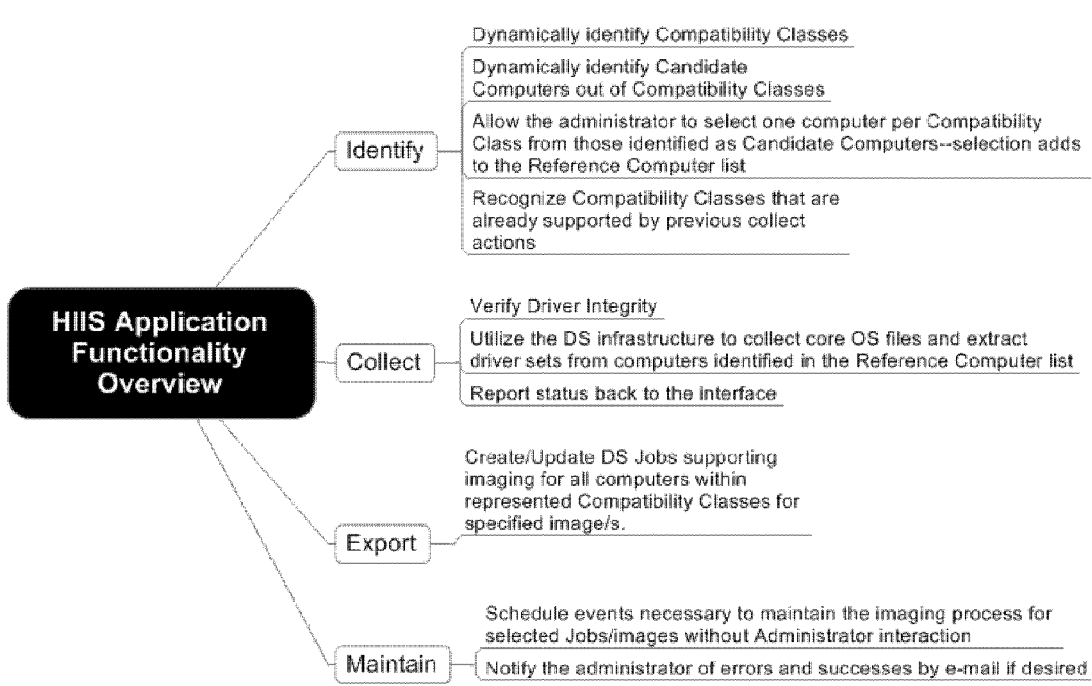

HARDWARE INDEPENDENT IMAGING METHOD

RELATED APPLICATIONS/CLAIM OF PRIORITY

This application is a divisional of the U.S. application Ser. No. 11/972,500, filed on Jan. 10, 2008, which is related to, and claims priority from, U.S. Provisional Application Ser. No. 60/879,968, filed Jan. 11, 2007, both of which are incorporated by reference herein.

BACKGROUND

The present invention relates to a new and useful Hardware Independent disk imaging method that is particularly useful in a Windows PC and other operating system environments.

Disk imaging was created a number of years ago as a way to speed up computer deployment, rather than the old technology of inserting a CD ROM, or other media, and loading up a computer "operating system" (e.g. Windows, Linux, Unix, etc) by a manual file copy, which is what the manufacturers set up process in fact did.

Imaging took a completely set up computer and then the procedure was to insert a boot floppy, or some other boot media, and capture that fully configured hard drive of data (consisting of the operating system, applications, hardware device drivers, user data and configuration to any of the preceding). The emergence of "disk imaging" or "imaging" would be circa Windows 95 or Windows 98, about that time frame which had all the drivers and applications loaded, and it would take a snapshot of that drive and imaging would be accomplished by booting the system to a "pre-OS" (typically this was Microsoft DOS or some other small lightweight operating system on a boot floppy that had a primitive networking client and an imaging agent).

What the imaging agent did upon being booted would be to follow the user's instructions to either capture an image, which is to read the hard drive that presumably had an operating system, along with hardware device drivers, applications and whatever configurations that were intended to be captured. It would then use its networking client to copy the complete content of the drive up to the server. However, it wouldn't perform this capture file-by-file; rather it would actually take a look at the data as it was laid out on the hard drive without bothering to read or understand what the data was, where files started and stopped, and what types of files those were—all of which are of concern when copying data file-by-file. The agent instead just looked at the massive data on the hard drive and stored the nature and the arrangement of that data in a single file. Thus, a user's computer would be captured in a very large single file, but it could be done quite efficiently because the previous methodology would be to perform a file-by-file copy operation (e.g. a file backup). A comparable analogy to file copying versus imaging would be where if a file copy would be like taking a newspaper and retyping it word-for-word, disk imaging would be like making a photocopy of the newspaper and being able to see the exact text and it's arrangement and relation without caring about what the words said. The photocopy machine doesn't care what the text means and it doesn't have to read it, it doesn't care where words start and stop, all that matters is that it can recreate that. And that's a lucent analogy to disk imaging. It just takes all the data, copies it up onto the network typically and to a large single file which can then later be restored to that or another computer using the same process in reverse direction. In a scenario where a user wanted to protect against a crashed hard drive or wanted to load a larger hard drive and move all of the user's data, a disk image or snapshot would be taken, with any of a number of available imaging tools NOTE: There are a number of imaging tools back when disk imaging was invented, but Ghost was one of the more popular ones and in fact some refer to disk imaging as "ghosting" a hard drive. Altiris also had an imaging agent called Rapid Deploy which acted and behaved similar to the Ghost tool, in its early days. In its later days, Altiris integrated the Rapid Deploy tool into an integrated client/server platform that allowed administrators to control imaging and other aspects of PC deployment from a centralized server console.

From a process advantage standpoint, disk imaging, or hard drive imaging, took the act of deploying a computer which typically took from 2-3 hours to do the install, set up the applications and move the data, and really made redeploying a cloned copy of a computer a matter of half hour or less that was totally hands off because the imaging agent was dumping data down to a disk rather than asking configuration questions that are typical of performing a traditional media based operating system setup.

Altiris made the process better with its tool called Deployment Server. Deployment Server added a central server console for disk imaging and other deployment aspects such that the disk image could be laid down and from a centralized console. So, no longer did someone have to actually go to a system and boot it with a boot floppy. With Altiris, a system could be configured upon boot to look at some network resources, or a virtual boot floppy could be stored on the computer's hard drive and act just like a floppy that was inserted into the disk and it could be booted to a pre OS. The same types of pre OS that we saw in the early days of imaging are usable in the Altiris Deployment Server world. Those are DOS, Linux and newly arriving upon the scene was Windows PE, which is a thinned down version of Windows XP. So now instead of the 8 bit DOS world, we're able to operate 32 bits, a much faster newer code, and better take advantage of our hardware. Instead of having one person load a floppy, with the Altiris console, you could see a number of machines, such as in a scenario where we had a computer lab at a school to void with 25 machines, an Altiris Administrator could go to the DS console and designate those 25 machines and drag and drop an image job on them and it rolls the image out to the different machines. The Altiris system stays in constant communication and control of its managed machines, and has the ability to tell them to boot down from Windows and to a prescribed pre OS and accept a certain disk image.

So, imaging worked well. It was and remains an efficient means to deploy computers, but there is a problem. When you take an image of a computer, it's just that, an exact and complete copy of that computer's data and data arrangement without respect to the proprietary nature of the hardware from which it may have come. With a disk image, you can take an image off a template computer with the intent to deploy it to numerous business systems. And, this is in fact how companies currently standardize their computer deployment. It's a staple procedure, but it does have some limitations in that the data from the PC from which the image was taken includes all the hardware device drivers and other operating system files that are proprietary to that exact make, model and hardware configuration of the computer from which that disk image was taken. That gives rise to an issue in that as long as the hardware is sufficiently different from the template machine, the image often failed upon boot because the device drivers are not proper for the target system. An image taken from a desktop often would not work on other models . . . or sometimes even on like model system that had hardware differences introduced by the OEM or by corporate staff during or post deployment. What matters is that unaltered disk images will only work on PC's that are very similar in hardware build to the image source machine, and that even within a model group, some differences can occur such that images were sometimes not usable within a PC model group.

As a partial solution to this issue, Microsoft invented a technology called Sysprep and it would run on a system just prior to being captured for imaging and it attempted to make the image more generic by removing hardware references in the Window system that were to hardware proprietary to the image source system. This made the image upon boot not try to load specific drivers, but DID NOT provide the correct drivers for the system targeted to receive the image. The method companies currently use is to try to catalog all the different models of all the different systems deployed in their environment, get those systems in a lab or test environment, obtain the device drivers from varied Internet (which can be a significantly labor intensive process to extract the device drivers in a format compatibility with Windows Plug and Play loading), copy all the "driver packs" to the system about to be captured as an image and finally, run Microsoft Sysprep on it. It should be noted that the step of loading the driver packs in the image can inflate the disk image to twice its nominal size or even more.

It's not uncommon to support 20 or more models or to have 2 or 3 GB of drivers on the system in order to support some of those different models. Again, it must be emphasized that this often doubles the size of the image, which means every time it's transmitted across to a system for deployment, most of the data may in fact be wasted because it's actually device drivers that don't apply to that system, but we had to have them there just in case. So Altiris developed a technology called FIRM Injection and tokens. What this pair of technologies do (in the case of FIRM) is to provide a way to copy files across the network into an image and (in the case of tokens) to allow variables in scripts that Altiris Deployment Server evaluates against any data in its management database, that is associated with a specific PC system being deployed at any given moment, and substitutes the variables with values specific to a PC being deployed at any given moment. So, instead of having a bloated image with all the drivers in the image, what it is possible to do, is to load up the device drivers on the actual server use Altiris and FIRM to lay down the image on a target system and before allowing it to boot, a specialized script could be created that would effectively provide a way to copy administrator provided driver packs down into the image. The tokens allow the strategic placement of a key variable (usually PC model number) in a file copy path so that the copy could select the proper driver pack from the server (this assumes that the administrator shared PC driver packs on the server that were arranged in folders that had the PC model (or other relevant token) as part of the path:

FIRM COPY \\DeploymentServer\eXpress\drivers\<modelnumber> to the local drive of the freshly imaged, but not yet booted system. NOTE: The above command line syntax has been "paraphrased" from the actual Altiris compatible syntax to conceptual clarity for those reading this work that are not familiar with Altiris proprietary command line syntax.

This worked well, but it is still necessary to:

a. Inventory the environment to obtain a list of PC models, procure the model samples and get them in a test lab. (Time est. 1 to 7 days depending on inventory data availability), b. Find all the drivers—e.g. download them from the OEM site or use a driver backup utility—which often produces results that are not fully compatible with Windows Plug and Play. (Time estimated is a function of the number of models, but typically took weeks to many months to support organizations that have thousands or tens of thousands of PC's with the accompanying hardware variance), c. Build the scripts necessary to utilize FIRM and tokens in a way that that could successfully employ them (usually 1-3 weeks for individuals to debug and deploy a working scripted deployment model), and d. Continually monitor and maintain the process, running hardware inventories to identify newly emerging models and use the above steps to allow them to be supported by the corporate hardware independent imaging (HWI) process.

Applicants discovered limitations with the above process. Applicants found that deployed systems, even with the right model driver pack, did not always rebuild correctly and the drivers didn't always work. The reasons applicants discovered for that were because within PC models (just as is the case with cars) there are some options that can be ordered that are different. Just because two computers are the same models does not mean they have the same video card, network card, etc and users could have put any number of hardware cards in the computer after deployment, or as part of deployment. Consider that it is now as easy as plugging a device into the USB port on the front of a PC to add a device not provided for by the model concept. Thus it is trivial to change the hardware nature of a PC and in fact likely that the corporate user or IT staff will meaningfully change the hardware build of a many of their managed PC systems such that model based driver packs will not reliably work. Ultimately the model of the system ceases to have meaning in terms of any guarantee that a given driver pack will work from one system to another based solely that they are the same model.

SUMMARY OF THE PRESENT INVENTION

The present invention (sometimes referred to herein as HIIS) addresses the foregoing issues that applicants discovered with the above process, and provides a method of organizing and automating a hardware independent disk imaging deployment process, e.g. for Windows PC and Server operating systems, that uses a server that both has a database of computer PC hardware data that can be electronically analyzed, and serves to organize gathering and staging of device driver packs, and that acts as a staging and distribution point for those driver packs. In its current form, which is utilized with a Windows based operating system, the method of the present invention comprises the following process steps:

a. electronically analyzing the database of computers, and grouping the computers into Compatibility Classes, each compatibility class having systems that have been analyzed to have an administrator configurable scope of all deployment-relevant hardware devices in common, thus accounting for hardware variance within model groups, b. electronically identifying candidate computers that will serve as collection targets for gathering (remote collection performed over the network) of device drivers (e.g. compatibility class native sets of drivers) for each compatibility class group, c. electronically extracting device drivers and other hardware related data from a selected candidate computer, and d. electronically configuring deployment jobs that will first perform a disk image of the computer and then inject the correct device driver pack into the newly imaged computer (before it is booted into Windows) so that it can successfully boot into Windows with its proprietary hardware supported.

In addition, the present invention provides methods for building on the foregoing concepts and providing additional HITS capability for other operating systems, and also providing other new and useful HIIS based capabilities for compiling driver sets that can be distributed to computers at preboot and propagated from organization to organization by way of an Internet resident global driver repository server application Other features of the present invention will become further apparent from the following detailed description and the accompanying drawing and Exhibit.

BRIEF DESCRIPTION OF THE DRAWING AND EXHIBITS

FIG. 1 is a schematic illustration of a method that provides hardware independent disk imaging, according to the principles of the present invention; and Exhibit A is a detailed specification of steps components and other features for implementing a hardware independent disk imaging concept, according to the principles of the present invention.

Exhibit B is a glossary of some of the terms used in this application.

DETAILED DESCRIPTION

As discussed above, the present invention relates to a new and useful method of organizing and automating a hardware independent disk imaging deployment process, e.g. for Windows PC and Server operating systems, that uses a server that both has a database of computer PC hardware data that can be electronically analyzed, and serves to organize gathering and staging of device driver packs, and that acts as a staging and distribution point for those driver packs. The method (is part of an overall method that is sometimes referred to herein as HIIS) and in its current form, that is designed for a Windows based operating system, comprises the following process steps:

a. electronically analyzing the database of computers, and grouping the computers into Compatibility Classes, each compatibility class having like model systems that also have been analyzed to have an administrator configurable scope of all deployment-relevant hardware devices in common, thus accounting for hardware variance within model groups, b. electronically identifying candidate computers that will serve as collection targets for gathering (remote collection performed over the network) of device drivers (e.g. compatibility class native sets of drivers) for each compatibility class group, c. electronically extracting device drivers and other hardware related data from a selected candidate computer, and d. electronically configuring deployment jobs that will first perform a disk image of the computer and then inject the correct device driver pack into the newly imaged computer (before it is booted into Windows) so that it can successfully boot into Windows with its proprietary hardware supported.

FIG. 1 schematically illustrates the foregoing method as part of an HIIS system and method for an Altiris managed server and a Windows based operating system. The HIIS system includes four primary steps—Inventory, Collect, Export and Maintain—that organize, automate, and make effective a hardware independent imaging process.

Identify

HIIS for Altiris is loaded upon an Altiris Server (the HITS components shown in FIG. 1, and the HIIS functionality, can all be provided by that server). HIIS analyzes the backend database of managed systems on the Altiris server. That database contains device information in terms of what devices are currently plugged into the computer. HIIS takes advantage of the device information that Altiris obtained from Windows using common Microsoft Windows application programming interface (API) calls. It takes that information and separates and organizes groupings of systems into "Compatibility Classes". Compatibility classes are defined as group of systems that are in fact the same properties, e.g., manufacturer, model, have the same number of processors and have all (or an administrator configurable subset of) hardware devices in common. So now, whereas an example organizational computer support department may think it has to only make provision for a known 20 models in a 4,000 PC managed environment, due to the actual model PC hardware variance and hardware variance due to peripheral attached devices, HIIS both exposes the reality that there may actually be 200 or more discrete hardware platforms ("Compatibility Classes") and automates deployment driver handling for those classes. HIIS can build the compatibility classes using two points of information, namely the device names or device ID's, both of which represent effective identifiers for cataloging the devices on the machine.

One is the device name. This is a value that's established for the driver loaded for the device. It is possible for two different versions of the driver to post two different names. Then HIIS, in device name mode, may have two versions of a driver and have two identical systems at a hardware level, but those two systems may in fact end up in different compatibility classes even though the hardware is identical. So, device name mode works well, but it is subject to some software caused variance within device drivers and among operating systems. For example:

If Windows 2000 and Windows XP are loaded on two different systems, it is not unusual for something in the build from one OS to the other, typically the driver version, to change the device name that are actually registered and thus harvested by Altiris and so we end up with a good set of compatibility classes, but perhaps more than what is strictly necessary given the hardware.

This is one of the reasons that HIIS has device ID mode. The device ID is an alpha-numeric value that is assigned uniquely to each different hardware device on the system bus on the computer. It is stored in the chipset of the device itself, so it's not subject to software-caused variances within operating systems or device driver versions. HIIS has device ID mode and it groups these compatibility classes based on the Device ID. This value is not detected by default by Altiris, so HIIS has an advanced hardware inventory (AHI) job that can be run that returns more granular information about each managed computer including the device ID driver version and some other details. So, however the grouping mechanism, whichever mode is utilized, the first stage for HIIS is to efficiently identify what exists in an environment. With HIIS technology, that informational granularity now extends beyond the model and goes down to the device and groupings of systems that have only and exactly the same devices. That knowledge is very powerful. HIIS establishes this information and injects it into the Altiris Deployment Server database for later use during deployment. Importantly, HIIS only takes a few minutes to analyze an Altiris Deployment Server database so the information with which it provides the deployment process need now only be based on environment data which is minutes (instead of months) old.

Once compatibility classes are established, the HIIS administrator elects one representative from each different computer compatibility class. So even though a compatibility class may have 500 members or 20 or 1, it doesn't matter, one system that runs the target operating system which is set in the tool, can be elected by the administrator to be a template or a driver donor for that class. Remember, that class means that they are the same model and have exactly and only the same devices in common. HIIS has a number of filters that allow some elected devices opting in and out, so devices in/out of scope for consideration can be controlled by the administrator to a large degree. Thus, effectively compatibility classes can have exactly and only the same hardware devices in common or (more practically) have an administrator configurable scope of all deployment-relevant hardware devices in common. This means that HIIS can be administratively configured such that some select variance of hardware devices can be tolerated within a compatibility class to allow hardware device variance (such as different mice or keyboards) to exist, so long as it does not present a deployment driver obstacle. Mice and keyboards typically aren't considered a deployment relevant hardware difference to and administrator because their support is so standardized in modern PC operating systems that no special driver provision need be made. HIIS device filters are also useful to allow "virtual devices" (i.e. devices that are created in an operating system that actually are software entities and do not reflect true hardware differences) such as VPN network adaptors can be filtered out so they don't act as a delimiter for compatibility classes since they do not reflect the hardware device makeup of an analyzed system. So, HIIS facilitates critical filtering capability and device level analysis such that it provides a workable assurance that drivers harvested from one member of a compatibility class will in fact reliably work on the rest of the members of the compatibility class. So that way we are no longer dependent on models and the issues that give rise. Compatibility classes make possible a critical and meaningful deployment management grouping unit that models suggest, but do not reliably deliver.

Collect

HIIS takes administrator selected compatibility class members, referred to as "candidate computers" or "reference computers", and runs a silent driver scraping job on them. This driver scraping job, grabs the drivers from the system (e.g. it harvests compatibility class native sets of drivers) and the hardware abstraction layer (HAL) files from Microsoft (which, like device drivers, can also be important in some cases to make an image from one computer to work on a computer that has a significantly different hardware build) and it stores that data up on the server and also registers class membership within the Altiris database. These driver packs have also been "scrubbed" for anomalies that can interrupt a fully-automated hands-off Plug and Play process.

Export

The next step is that HIIS automates the creation of jobs within the Altiris environment by giving input values such as which Sysprep image, which Sysprep.inf file, and whether hardware abstraction layer injection is desirable, driver injection and what not. Once the administrator chooses these options, HIIS creates a job within Altiris that's basically constructed as:

Task 1: Lay down the disk image just like the old-fashioned way;

Task 2: Complete a look up in the database, see which compatibility class the system in question is a member of and grab the associated driver pack and if it specifies the hardware abstraction layer and inject it. Copy it from the server down into the image that has been freshly laid down, but not yet booted up—and there are other files that get copied as well, the Sysprep resources and we have a Restore.exe application that basically assures that the drivers that get copied down are properly fed to plug and play which initiates when the freshly imaged system is started up for the first time.

HIIS has taken what may be two or more gigs of drivers in a fat image and reduced it to approximately 35-150 megabytes, drastically reducing both the time and the amount of data that has to go down as a driver pack to a machine. It has also taken the analysis phase that's necessary and typically stopped short at models and really take it down to the compatibility class/device level analysis. Now, we've basically taken the hardware independent imaging level of effort necessary which is typically months, at least weeks, but typically months to support a large organization to complete thousands of computers or tens of thousands of computers, and reduced it to a level that could be accomplished in a day or sometimes less. We lowered that level by orders of magnitude . . . literally from months to hours while increasing the quality of the process. HIIS is also a new concept in that it innovates a maintenance cycle into the management process. Again, HIIS is a new cross-spectrum management tool that even automates the creation of the syspreped image and copies it up as well as the configuration of the sysprep file in addition to the other management duties previously mentioned such that it does provide "end-to-end" automation and management of the hardware independent imaging and deployment issue.

Maintain

Maintenance is one of the largest time and resource commitments that organizations make when fielding a hardware independent imaging initiative. A problem typically occurs when new hardware is introduced into the environment; however, that's not a problem for HIIS because it continually interrogates the deployment server on a regularized administrator's specifiable interval to look for new hardware. Any new PC systems that emerge in the Deployment Server management system is identified and either classified into an existing compatibility class, if it fits, or if it's truly new hardware to the environment, it will found a new compatibility class and have its drivers automatically scraped (assuming it is running the target operating system specified in the application).

Detailed Specification (Exhibit A)

Exhibit A is a more detailed specification that explains the HIIS system, its operation and implementation in more detail.

Glossary (Exhibit B)

Exhibit B is a glossary of some of the terms used in this application.

ADDITIONAL EMBODIMENTS

The principles of the present invention, as described above, can be used to provide HIIS capability for other operating systems, and also to provide other variations of HIIS based capabilities for compiling driver sets that can be distributed to computers in preboot.

For example, the HIIS concepts described above can be modified to extend the existing device ID handling capability in the HIIS concepts, to a model that dynamically interrogates clients during provisioning (i.e. the during which the computer has received its OS image, but before it is booted up) and matches the resultant Device ID list with drivers in Windows (or another operating system being used by the computer, which means at the pre-operating state of those computers the device ID's would be scanned by an executable bus scan job (instantiated by the HIIS server) and the HIIS server would compile a driver pack tailored to match the remitted Device ID list for any HIIS managed computer undergoing provisioning. If the HIIS server is missing any device drivers in its local (HITS server resident) driver repository, the needed Device ID's can be retrieved from a driver broker like DriverGuide.com or one of the OEM's PC vendors like Dell, HP or other OEM system manufacturers, using a web service for them supplying the contents in xml or some other mutually acceptable format and getting in return the appropriate device drivers, which when combined with the drivers catalogued on the HIIS server would then be blended into a complete driver pack for the PC system in question (and thus for any of its peer compatibility class members).

In another variation that is based on the HIIS concept of the present invention, the HIIS server would have drivers to supported Device ID mapping and driver file system location organized in a database rather than in the HIIS server's file system and keyed off the Device ID. At deployment time, the submitted device list (e.g. from the computer interrogation) is uploaded from the client to the HIIS server where it is then matched up with the right driver pack in the file system, thus eliminating the need to store redundant copies of device drivers in the file system. This type of system would give rise to a capability to create a scanned driver pack and a device under the imaging operating system via DOS, Linux or Windows PE (or another operating system), and enumerate the different devices that are on the bus, provide that information to the HIIS server and then have ultimately remitted a custom built driver pack which the client PC will use on its initial provisioning boot The HIIS concepts of the present invention also provides an easy to use a graphical interface that will allow an administrator the ability to identify versions of drivers that would be desirable to replace or in the case of a failed driver, to be able to easily grab that driver and apply it to any compatibility class. HIIS will also provide the capability to associate software delivery jobs to compatibility classes or specific onboard devices so that systems with specialized hardware devices will be provided an appropriate driver so that the client OS can communicate with the device and a corresponding application that enables that hardware to be utilized productively. The interface will allow administrator to enter in a compatibility class or device name or device ID and associate it with an executable (and presumably silent install command line) so that deployment policy can be established that provides for automated distribution of hardware specific applications.

Thus, as seen from the foregoing, the present invention also provides a method of configuring and automating a hardware independent disk imaging deployment process using a server that can be electronically configured with device deployment criteria and related software that enables the server to respond to an interrogation from a computer at preboot (i.e. before the computer is booted into the operating system) to compile a matching driver set that can be electronically returned to a computer at preboot. According to the method, the HIIS server is configured with device deployment criteria and related software that can be selectively input to the server (e.g. by an administrator). The deployment criteria and related software enables the server to respond to an interrogation by a computer during a preboot, to use the deployment criteria and related software to compile a matching driver set that can be electronically returned to the computer at preboot. More specifically, the client PC undergoing provisioning, is electronically interrogated during a preboot, and the HIIS server accesses and uses the deployment criteria and hardware device information to (i) compile a driver set match for the operating system, and (ii) electronically return the driver set match to the computer at preboot, for copying the driver set match to the operating system into which the computer will be booted.

In addition, in yet another method of configuring and automating a hardware independent disk imaging deployment process, according to the principles of the present invention, the HIIS server is configured to warehouse a set of unique driver IDs and matching INF files that is has gathered from the existing set of HIIS managed computers. When provisioning a computer at preboot, the HIIS server uses a more simplistic scan of the provision computer to just obtain the model rather than the complete device list. Upon obtaining the model information from the client undergoing provisioning, HIIS compiles a meta driver pack of all unique catalogued drivers that have been associated with that given model and remits the driver pack to the client. As discussed herein, HIIS provides historically unavailable system classification capabilities to enterprises such that a large (e.g. thousands, tens of thousands or even large PC network environments) can, in a matter of hours and over network links, be analyzed, classified and efficiently harvested for drivers. HIIS thus provides unique capabilities to aggregate drivers and (in the database) map them to BOTH devices and system classes. It is envisioned that HIIS servers can be connected to an Internet resident global driver repository server application (herein "GDR") that allows the uploading of collected system classes and associated drivers. It would also allow the uploading of individual device ID's and associated drivers and thus use HIIS's unique access to corporate computing environments, on an opt-in basis, allow driver packs captured (or added to HIIS by the HIIS system administrator) in one corporate environment to be matched to related hardware through the compatibility class or device ID mechanism, and to be rated for efficacy, then uploaded to the GDR and finally downloaded in a ready to use format to another HIIS server who has submitted to the GDR a list of compatibility class or Device ID coverage requirements. The internet based GDR interface and data repository is equipped with a compatibility class rating system that effectively "classifies" each compatibility class for end users. This classification will be visually represented in the following rating system: A rating—reveals that that package is enterprise ready being successfully deployed in a corporate environment without error. B rating—reveals that the package source originated from a corporate environment but has yet to report error free deployment. C rating—The package was created by our system from multiple sources and is yet to report error free deployment. The GDR then remits the required drivers to the requesting HIIS installation and thus propagate the required drivers from one HIIS installation to another in either inter or extra-organizational manner as needs arise. It is also envisioned that an organizational driver repository (herein "ODR"—essentially the same as a GDR . . . only implemented and used within a single organization's network environment) version of the GDR would be created to provide GDR functions within an organizational environment. The ODR will have other functionality enabling it to propagate both drivers and configuration policy between HIIS installations. Further descriptions (and illustrations) of the GDR and ODR systems and functions are provided in Exhibit B.

It should be noted that other technology providers provide client/server imaging environments and FIRM equivalents so the HIIS concepts described above are not ultimately restricted to use in Altiris environments although its current iteration does require Altiris Deployment Server for foundational client server imaging, FIRM and token evaluation capabilities.

From the foregoing description, it will be clear to those in the art that in one of its basic aspects, the present invention provides a method of organizing and automating a Windows PC hardware independent disk imaging deployment process, for Windows operating system based computers, that uses a server that (i) has an inventoried database of computer PC hardware data that can be electronically analyzed to enable computers which were inventoried for their hardware device data to be logically organized into discrete hardware classes and facilitates the adding, gathering and staging of device driver packs, and (ii) acts as a staging and distribution point for those driver packs. The method comprises (a) inventorying a set of computers and analyzing the database of computer PC hardware inventory data, and grouping the computers into compatibility classes, each compatibility class having systems with an administrator configurable scope of all deployment-relevant hardware devices in common, thus providing a representation of actual discrete hardware platforms that can be used in disk imaging-based deployment of Windows operating systems to computers of each compatibility class; (b) electronically designating target compatibility class representative computers and harvesting compatibility class native sets of drivers from those class representative computers by electronically transmitting the device drivers from the compatibility class representative computers to the server and/or allowing administrator addition of original equipment manufacturer supplied drivers to supplement or replace collected drivers on the server and transmit other hardware related data from the compatibility class representative computers to the database of computer PC hardware inventory data; and (c) electronically configuring deployment jobs that will first apply a Windows disk image to a computer, that is targeted for deployment, and then inject from the server the correct device driver pack into the newly imaged computer (before it is booted into Windows) so that it can successfully boot into Windows with its class of hardware supported.

It will also be clear to those in the art that a method according to the present invention provides for organizing and automating a hardware independent disk imaging deployment process for an operating system that uses a server that (i) has an inventoried database of computer PC hardware data that can be electronically analyzed to enable the computers, which were inventoried for their hardware device data, to be logically organized into discrete hardware classes and facilitates the adding, gathering and staging of device driver packs, and that acts as a staging and distribution point for those driver packs, comprising the steps of: (a) electronically inventorying a set of computers and using the resulting inventory data to facilitate grouping the computers into compatibility classes, each compatibility class having systems with an administrator configurable scope of all deployment-relevant hardware devices in common, thus providing a representation of actual discrete hardware platforms that can be used in disk imaging based deployment of the operating system to computers of each compatibility class; (b) electronically designating target compatibility class representative computers and harvesting compatibility class native sets of drivers from those class representative computers by electronically (i) transmitting the device drivers from the compatibility class representative computers to the server file system and/or allowing administrator addition of original equipment manufacturer supplied drivers to supplement or replace collected drivers, and (ii) transmitting other hardware related data from the compatibility class representative computers to the database of computer hardware inventory; and (c) electronically configuring deployment jobs that will first apply a disk image to a computer that is targeted for deployment, and then inject the correct device driver pack into the newly imaged computer (before it is booted into the operating system) so that it can successfully boot into the operating system with its class of hardware supported.

Still further, it will be clear that the present invention provides a method of configuring and automating a hardware independent disk imaging deployment process, using a server that is both configured to host a database of computer device IDs and also maintain a set of associated drivers such that the server, given a list of device IDs that has been compiled by interrogating a set of computers during preboot, can match and compile a set of drivers and return the required set of drivers to be to the computer at preboot, comprising the steps of: (a) providing a server that is electronically configured to (i) host a database store of device IDs and associated driver files, (ii) use the device IDs and corresponding driver files to match and compile a set of drivers for the operating system of a computer that has been analyzed for physically present devices during a preboot state, and (iii) enables the matching set of drivers to be electronically transmitted to the computer during the preboot deployment event, (b) using a server initiated process or computer resident executable to facilitate electronically interrogating the computer during a preboot, comprising communicating driver device IDs from the computer to the server, and (c) electronically operating the server to (i) identify driver matches for the operating system, and (ii) compile a set of the driver matches that are electronically returned to the computer during the preboot, so that the set of driver matches can be copied to and used by the operating system that will be installed/loaded upon booting the computer into a production operating system.

Moreover, it will be clear that the present invention provides a method of configuring and automating a hardware independent disk imaging deployment process using a server that can be electronically configured with device deployment criteria, including a database of device ID's and a library of matching driver files that have been electronically collected or added to the server, and related software that enables the server to respond to an interrogation from a computer at preboot to compile a matching driver set that can be electronically returned to the computer at preboot, comprising the steps of: (a) a. providing a server configured to host a database of device ID's and a library of matching driver files, and deployment criteria and related software that can be selectively input to the server, and enables the server to effect and/or respond to the data resulting a scan of the computer at preboot and to use the deployment criteria and related software to compile a matching driver set that can be electronically returned to the computer operating system at preboot of the computer, and (b) electronically interrogating the scope of devices on a computer designated for deployment by the server during a preboot state or a prior boot to a production operating system, based on the operating system of the computer, and electronically operating the server, using the deployment criteria and the related software to (i) compile a driver set match for the operating system, and (ii) electronically return the driver set match to the computer during the preboot, for copying the driver set match to the operating system that will be booted on the computer.

Also, it will be clear that the present invention provides a method of enabling hardware independent disk imaging or scripted deployment of an operating system by providing required drivers and associated computer device information to an organizational driver repository and deployment server which ultimately provides the required drivers and computer hardware device information to an organization computer system for purposes of disk image or scripted operating system deployment, comprising the steps of: (a) providing an Internet resident global driver repository server that receives, stores and provides computer hardware device deployment data and associated driver packs electronically acquired from one or more organizational driver repository and deployment servers or from device driver vendors, where the device deployment data includes any or all of (i) compatibility class data comprising one or more compatibility classes, each of which represents administrator configurable deployment relevant hardware drivers that can be used in disk imaging of an operating system to computers of that compatibility class, and (ii) device ID's, and a library of matching driver files with associated driver date and versioning information; (b) electronically interfacing an organizational driver repository and deployment server with the Internet resident global driver repository server to enable the organizational driver repository and deployment server to communicate to the Internet resident global driver repository server the device deployment data requirements of the organizational driver repository and deployment server to enable the organization driver repository and deployment server to act as a staging and distribution point for hardware independent disk imaging and/or scripted deployment of an operating system to computers of the organization requiring the driver and associated device data; (c) electronically communicating from the Internet resident global driver repository server to the organization driver repository and deployment server the driver files and associated computer hardware device information required by the organizational driver repository and deployment server to enable the organization driver repository and deployment server to act as a resource and/or staging and distribution point for hardware independent disk imaging or scripted operating deployment of an operating system to computers of the organization requiring the driver and associated hardware device information resources; and (d) electronically interfacing the an organizational driver repository and deployment server with the Internet resident global driver repository server such that bi-directional exchange of device drivers, driver versioning, driver date, driver associated device ID and driver deployment telemetry and/or organizational driver repository and deployment server administrator provided driver installation and functional success ratings can be enabled to the end of consolidating deployment useful drivers and data at the Internet resident global driver repository and propagating required drivers and data to interfaced organizational driver repository and deployment servers.

With the foregoing disclosure in mind, it is believed that various adaptations of a hardware independent disk imaging system and method, according to the principles of the present invention, will be apparent to those in the art.

The invention claimed is:

1. A computer implemented method of analyzing and cataloging nodes in a computer network into a hierarchy of classes, the method comprising the steps of:
   determining nodes in the computer network to be analyzed by selecting a portion of the nodes in the computer network;
   dynamically interrogating one or more databases of nodes to gather data properties for the nodes to be analyzed;
   determining a scope and detail of the gathered node data properties;
   determining a plurality of classes for cataloging the selected nodes, each class having a class level;
   defining a number of class levels of the selected nodes for cataloging said nodes according to the number of class levels;
   storing in a storage medium, analytic grouping rules specifying database properties that define each class level;
   electronically processing the scope of the gathered node data properties, according to the analytic grouping rules to classify the selected nodes with the determined classes according to the gathered node data properties;
   dynamically generating compatibility classes for the selected portion of the nodes, wherein each compatibility class includes nodes that have data properties of the same scope and detail;
   cataloging the selected nodes based on the compatibility classes; and
   transmitting data of the cataloged nodes for displaying the cataloged nodes.

2. The method of claim 1 further comprising performing post-analytic comparative analysis by detailing a visual illustration of the commonalities and/or differences in data properties between the selected nodes or classes of selected nodes.

3. The method of claim 1 further comprising performing controlling a granularity of class analysis by using a user interface to configure the scope and detail of node data properties, where a listing of available data properties for analytic classification processing is presented and where a user indicates data properties for inclusion, or for exclusion or exclusion in catalogued, by indicating selections of the listed individual data properties values.

4. The method of claim 1 further comprising performing controlling a granularity of class analysis by using a user interface to configure the scope and detail of node data properties, where a user indicates data properties either for inclusion or for exclusion in the cataloging the nodes into classes, by creating rules that use individual data property values or combinations of multiple data property values of the selected nodes to designate a data property value for being considered for classification.

5. The method of claim 1, wherein the nodes are computer systems to be provisioned.

6. The method of claim 5, wherein said one or more databases of nodes store information about device drivers of said computer systems.

7. The method of claim 1, wherein one or more of displayed cataloged nodes are capable of being dragged and dropped to perform an action associated with said one or more of the cataloged nodes.

* * * * *